(12) United States Patent
Young

(10) Patent No.: US 6,563,600 B1
(45) Date of Patent: May 13, 2003

(54) SYSTEM FOR ENABLING A PRINTING APPARATUS TO OPERATE AT MULTIPLE SELECTABLE SPEEDS

(75) Inventor: David K. Young, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/389,685

(22) Filed: Aug. 30, 1999

(51) Int. Cl.[7] .............................................. G06K 15/00
(52) U.S. Cl. ........................................ 358/1.5; 358/1.13
(58) Field of Search .......................... 358/1.1, 1.5, 1.13, 358/1.15, 1.14, 412, 296, 443; 380/243; 710/14; 347/11; 700/40; 346/146

(56) References Cited

U.S. PATENT DOCUMENTS 5,312,193 A * 5/1994 Kringe et al. .......... 400/124.04
5,923,345 A * 7/1999 Imai .............................. 347/11

* cited by examiner

Primary Examiner—Arthur G. Evans
(74) Attorney, Agent, or Firm—R. Hutter

(57) ABSTRACT

A basic hardware platform of a copier or printer is selectably enabled to operate at different speeds, such as 40 ppm or 30 ppm, by a combination of entering a password into non-volatile memory within the machine, and also altering a state of a hardware switch within the machine.

18 Claims, 2 Drawing Sheets

SYSTEM FOR ENABLING A PRINTING APPARATUS TO OPERATE AT MULTIPLE SELECTABLE SPEEDS

FIELD OF THE INVENTION

The present invention relates to copying or printing apparatus, such as xerographic or ink-jet printers and copiers.

BACKGROUND OF THE INVENTION

In the office-equipment market, such as for printers and copiers, a common business model is to manufacture a single base "platform" in hardware, and then use the software controls over the hardware to provide a set of distinctly different products. For instance, with reference to digital xerographic "laser printers," a basic hardware platform capable of outputting 40 pages per minute (ppm) can be slowed down to output pages at 30 ppm or even 20 ppm, purely by altering the control software which operates the identical hardware. Typical techniques for slowing down a basic hardware platform include simply running the various electric motors at slower speeds, or deliberately skipping an operational cycle (not feeding a print sheet, and withholding image data) for one or more of a given number of hardware cycles. The advantages of this business model include the desirability of selling different speed-rated machines at different prices, and also the ability to speed up a sloweddown machine (such as by loading in new software) should an existing customer decide he wants a faster machine. Also, in a remanufacturing environment, it is useful to be able to minimize the number of hardware configurations that must be processed.

A technical challenge in providing office equipment of a single basic hardware platform at various speeds is to provide some security that the operating speed of a particular machine (such as at a customer site) will not be altered, such as to be speeded up, in an unauthorized or improper manner.

SUMMARY OF THE INVENTION

According to the present invention, there is provided a printing apparatus and a method of operating a printing apparatus. A control system operative of the printing apparatus is capable of operating the printing apparatus at a first speed and a second speed. A password is communicated to the control system, the password causing the control system to operate the printing apparatus at a selected one of the first speed and the second speed. A hardware switch is capable of being in one of a first state and a second state. The control system polls a state of the hardware switch, and operates the printing apparatus at the selected one of the first speed and the second speed only if the hardware switch is in a predetermined state consistent with the selected speed.

DETAILED DESCRIPTION OF THE INVENTION

Figure 1:
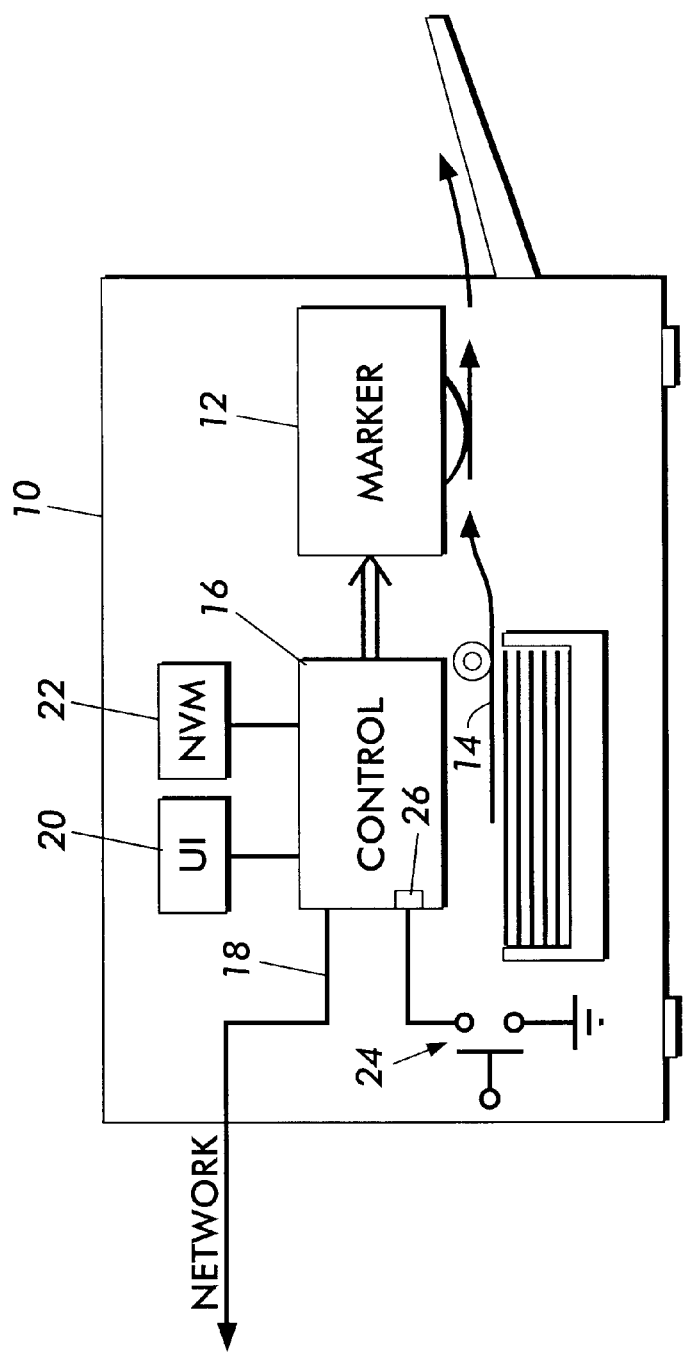
FIG. 1 is a simplified systems diagram showing essential elements of a digital printing apparatus, such as a "laser printer," relative to the present invention.

FIG. 1 is a simplified systems diagram showing essential elements of office equipment, such as a digital ink-jet or "laser" printer, relevant to the present invention. The printer (which, for purposes of the claims below, could be a device such as a fax machine, or digital or light-lens copier) 10 includes what is here called a marker 12, which should generally be considered the set of hardware which operates to place marks on a sheet. As such, the marker 12 could include a xerographic engine, an ink-jet printhead, thermal printer elements, etc. Print sheets drawn from a stack 14 are caused to move through or past marker 12 to receive marks thereon representing an image desired to be printed.

The basic hardware forming marker 12 is in turn controlled by software, which is embodied by a control system generally indicated as 16. As is well known in the art of office equipment, the control 16 includes any number of data-processing hardware and software for controlling the marker to output desired images. The control 16 can thus include a raster image processor, a facsimile capability, or even means for operating the light-lens hardware in a copier. Also as shown, control 16 can interact with a network connection 18, through which can be received not only image data but control data instructing the printer 10 to operate in a certain manner.

With particular relevance to the present invention, also associated with control 16 are a user interface UI 20 and a non-volatile memory (NVM) 22. The NVM 22 may be one of any number of memories associated with control 16, but the significance of the particular NVM 22 in the invention is that it should include thereon, at a predetermined location in memory that could be found by control 16, a specific "password," as will be described in detail below. What is important is that, in the course of the operation of machine 10, the control 16 at one point or another reads a certain amount of software from NVM 22, and based on what is read in the NVM 22, determines whether to operate marker 12 at one selected speed or another speed.

Also associated with control 16 is what is here called a "hardware switch" 24. Hardware switch 24 is simply a switch which connects a particular known pin within the board which embodies control 16 to ground. When hardware switch 24 is left open, the pin 26 will read high when polled, and when hardware switch 24 is closed to ground, pin 26 will read low; with regard to the claims below, the hardware switch 24 could be set in one or another state, open or closed. In various embodiments of the present invention, hardware switch 24 may comprise a simple toggle switch, a removable connector which can, depending on the design, either open or close hardware switch 24 depending on whether the connector is present, or could include a standard key lock which will only allow a person with a key to open or close the hardware switch 24. The significant feature of hardware switch 24 in this configuration is that it cannot be opened or closed by mere software manipulation, either through user interface 20 or over network 18. A person (such as authorized service personnel) must have physical access to the machine 10, and, in some designs, to have a special piece of removable hardware or a security device such as a key, to change the state of hardware switch 24.

In an additional configuration, the hardware switch could be a second NVM location check which is separate from the initial NVM location 22. In such a case, it is probably desirable that the "hardware switch" password be accessible only at machine 10 itself (such as through UI 20) while the password for NVM 22 is entered over network 18. It would be required for passwords to be entered both over the network and at the machine location itself, one password entry being in effect a check on the other.

According to a preferred embodiment of the present invention, the basic control software within control system 16 is, in itself, capable of operating the marker 12 at least two speeds, for example, at 40 ppm or 30 ppm. If marker 12 is a xerographic "laser printer" apparatus, one simple technique for being able to operate the marker 12 at either 40 ppm or 30 ppm is to maintain a running count of images generated by marker 12 and simply skipping every fourth image cycle, such as by withholding both a sheet from stack 14 and image data from control 16. In this way, the machine simply skips every fourth image producing opportunity, slowing the effective speed of the machine from 40 ppm to 30 ppm. (Of course, to slow the machine down further to 20 ppm, one would simply skip every other image producing opportunity.) Another technique for selectably slowing down the operation of the marker 12 is simply to slow down the motors which physically operate marker 12, and also to alter the input of image data from control 16 to marker 12 accordingly. With an ink-jet printing apparatus, other physical slow-down techniques can include, for example, instituting predetermined delays between the printing of each swath in a reciprocating printhead: this example would give the further advantage of allowing greater drying time to an image being printed. With regard to the software in control 16 operating marker 12, these various possible slow down techniques can be readily incorporated within a basic set of control software, so that these slow down features can be readily activated or deactivated by selectably branching to different routines within the same basic set of software.

As mentioned above, in order to instruct the control system 16 to operate marker 12 at one possible speed or another, such as either 40 ppm or 30 ppm, there can be selectably loaded into NVM 22 a password which, when read (such as at start-up, or more often) by control 16, instructs control 16 to operate marker 12 at a particular speed. There may be one password to be loaded into NVM 20 for operating the marker at 30 ppm, and another password that can be loaded into NVM 22 which, when read by control 16, instructs the control 16 to operate marker 12 at 40 ppm; the fact that no password is entered can also be assigned a value. This password can be entered into NVM 22 via UI 20.

For purposes of the claims below, the word "password" is used simply to represent any small amount of code which instructs the control 16 to operate the marker 12 at a particular speed; as such, the "password" can be some sort of some secret code known only to authorized personnel, or may not have any particular security aspect thereto, and could be, for example, the fact that a certain button on the UI 20 has been pushed. If, under one business model the passwords for operating the machine 10 at one or another speed are to be kept secret, only authorized personnel would be allowed to know the particular passwords; however, it may be desirable to have the user freely select, such as through UI 20, what speed machine 10 should operate at. Another possible security dimension is to access NVM 22 via network 18, so that a particular password can be placed in NVM 22 remotely, such as by the manufacturer of machine 10.

Significantly, according to the present invention, in addition to altering the password in NVM 22 for a speed change, there is also required a correct state of the hardware switch 24, the state of which is monitored by pin 26 which is located in the board embodying control system 16. According to one aspect of the present invention, in order to operate the machine 10 at a particular speed, there must be both a software instruction, such as by reading the password in NVM 22, and also a consistent hardware instruction, such as hardware switch 24 being opened or closed consistent with the password in NVM 22.

In one embodiment of the present invention, control 16 operates marker 12 at a default first speed, such as 40 ppm, only if a correct password is located at the predetermined location in NVM 22, and the hardware switch 24 is in the correct predetermined state (as monitored by polling pin 26). Control 16 will operate marker 12 at the second speed, such as 30 ppm, if either the password in NVM 22 or the hardware switch 24 state is incorrect. It should be noted that the default first speed can be higher or lower than the second speed, depending on a particular business model.

Figure 2:
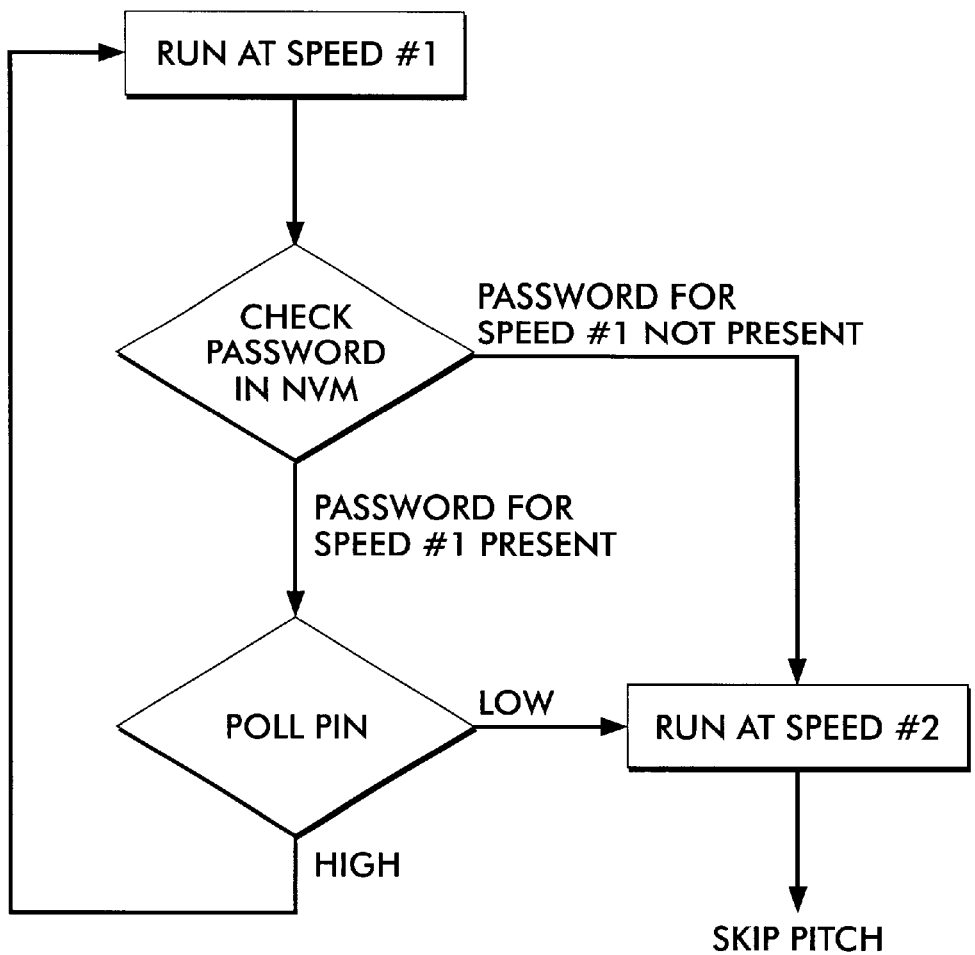
FIG. 2 is a flow chart illustrating a method of controlling a digital printing apparatus, according to one aspect of the present invention.

FIG. 2 is a flowchart illustrating both the hardware check of hardware switch 24 and the software check of NVM 22 that is required for a machine which operates at a first default speed ("speed #1") of 40 ppm to continue to run at 40 ppm. In the particular embodiment shown in FIG. 2, in order to operate the machine at 40 ppm, the suitable 40 ppm password must be at the predetermined location in NVM 22 and pin 26, when polled, must be high (meaning, the pin 26 must not be grounded via hardware switch 24). If either condition is not satisfied, the machine will run at its "speed #2" of 30 ppm.

Significantly, in a preferred embodiment, the software in control 16 must include therein all of the necessary code for operating machine 10 to operate at either 30 ppm or 40 ppm, and have a branch, such as shown in FIG. 2, that will enable either the 30 ppm or the 40 ppm to be selected by changing the password in NVM 22. By having both "slow" and "fast" software already loaded in control 16, altering the speed of a machine 10 is simply a matter of performing the password change and altering the state of the hardware switch 24: significantly, the code for operating the machine 10 at the "other" speed does not have to be loaded into control 16 every time the speed of a machine is desired to be changed.

In summary, the overall function of the present invention is to enable a basic hardware platform for a printer, such as 10, to be operated at different selectable speeds. The combination of a hardware alteration, such as through hardware switch 24, and a software alteration, such as entering a password in NVM 22, provides a level of security to prevent unauthorized or inappropriate changes in the operating speed of a particular machine 10.

What is claimed is:

1. A method of operating a printing apparatus, comprising the steps of:

providing a control system operative of the printing apparatus, and capable of operating the printing apparatus at a first speed and a second speed;

communicating to the control system a password, the password causing the control system to operate the printing apparatus at a selected one of the first speed and the second speed;

providing a hardware switch capable of being in one of a first state and a second state;

the control system polling a state of the hardware switch, and operating the printing apparatus at the selected one of the first speed and the second speed only if the hardware switch is in a predetermined state consistent with the selected speed.

2. The method of claim 1, the hardware switch being disposed within the printing apparatus.

3. The method of claim 1, the communicating step including communicating the password through a user interface directly connected to the printing apparatus.

4. The method of claim 1, the communicating step including communicating the password through a network connected to the printing apparatus.

5. The method of claim 1, the control system including a control program, the control program including code for operating the printing apparatus at the first speed and code for operating the printing apparatus at the second speed.

6. The method of claim 5, the control program including a branch between code operating the printing apparatus at the first speed and code operating the printing apparatus at the second speed.

7. A printing apparatus, comprising:
   a control system operative of the printing apparatus, and capable of operating the printing apparatus at a first speed and a second speed;
   means for communicating to the control system a password, the password causing the control system to operate the printing apparatus at a selected one of the first speed and the second speed; and
   a hardware switch capable of being in one of a first state and a second state;
   the control system polling a state of the hardware switch, and operating the printing apparatus at the selected one of the first speed and the second speed only if the hardware switch is in a predetermined state consistent with the selected speed.

8. The printing apparatus of claim 7, the hardware switch being disposed within the printing apparatus.

9. The printing apparatus of claim 7, the communicating means communicating the password through a user interface directly connected to the printing apparatus.

10. The printing apparatus of claim 7, the communicating means communicating the password through a network connected to the printing apparatus.

11. The printing apparatus of claim 7, the control system including a control program, the control program including code for operating the printing apparatus at the first speed and code for operating the printing apparatus at the second speed.

12. The printing apparatus of claim 11, the control program including a branch between code operating the printing apparatus at the first speed and code operating the printing apparatus at the second speed.

13. A method of operating a printing apparatus, the printing apparatus including a control system operative of the printing apparatus, and capable of operating the printing apparatus at a first speed and a second speed, and a hardware switch capable of being in one of a first state and a second state, the control system polling a state of the hardware switch, and operating the printing apparatus at the selected one of the first speed and the second speed only if the hardware switch is in a predetermined state consistent with the selected speed, comprising the steps of:
   communicating to the control system a password, the password causing the control system to operate the printing apparatus at a selected one of the first speed and the second speed; and
   setting the hardware switch in a state consistent with the selected speed.

14. The method of claim 13, the hardware switch being disposed within the printing apparatus.

15. The method of claim 13, the communicating step including communicating the password through a user interface directly connected to the printing apparatus.

16. The method of claim 13, the communicating step including communicating the password through a network connected to the printing apparatus.

17. The method of claim 13, the control system including a control program, the control program including code for operating the printing apparatus at the first speed and code for operating the printing apparatus at the second speed.

18. The method of claim 17, the control program including a branch between code operating the printing apparatus at the first speed and code operating the printing apparatus at the second speed.

\* \* \* \* \*